United States Patent
Zhu et al.

(10) Patent No.: US 11,878,291 B2
(45) Date of Patent: Jan. 23, 2024

(54) PEPTIZATION AGENT AND SOLID CATALYST MANUFACTURING METHOD

(71) Applicant: Saudi Arabian Oil Company, Dhahran (SA)

(72) Inventors: Guanghui Zhu, Dhahran (SA); Omer Refa Koseoglu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/744,805

(22) Filed: May 16, 2022

(65) Prior Publication Data
US 2023/0364592 A1   Nov. 16, 2023

(51) Int. Cl.
| | | |
|---|---|---|
| *B01J 29/04* | (2006.01) | |
| *B01J 29/08* | (2006.01) | |
| *B01J 21/12* | (2006.01) | |
| *B01J 37/00* | (2006.01) | |
| *B01J 37/02* | (2006.01) | |
| *B01J 37/08* | (2006.01) | |
| *B01J 37/20* | (2006.01) | |

(52) U.S. Cl.
CPC ............ *B01J 29/084* (2013.01); *B01J 21/12* (2013.01); *B01J 29/04* (2013.01); *B01J 37/0036* (2013.01); *B01J 37/0221* (2013.01); *B01J 37/08* (2013.01); *B01J 37/20* (2013.01); B01J 2229/32 (2013.01); B01J 2229/34 (2013.01); B01J 2229/42 (2013.01)

(58) Field of Classification Search
CPC . B01J 29/084; B01J 29/04; B01J 21/12; B01J 37/0036; B01J 37/0221; B01J 37/08; B01J 37/20; B01J 2229/42; B01J 2229/32; B01J 2229/34
USPC .................................. 502/60, 62, 63, 64, 79
See application file for complete search history.

(56) References Cited

U.S. PATENT DOCUMENTS

| | | |
|---|---|---|
| 4,500,645 A | 2/1985 | Fuchikami et al. |
| 6,399,530 B1 | 6/2002 | Chen et al. |
| 8,795,513 B2 | 8/2014 | Inamura et al. |
| 10,781,168 B2 | 9/2020 | Koseoglu et al. |
| 10,793,782 B2 | 10/2020 | Koseoglu et al. |
| 10,807,947 B2 | 10/2020 | Koseoglu et al. |
| 10,927,318 B2 | 2/2021 | Koseoglu et al. |
| 2020/0377451 A1 | 12/2020 | Koseoglu et al. |

OTHER PUBLICATIONS

Le Page et al. "Chapter 5: The Preparation of Catalysts." Applied Heterogeneous Catalysis, Design, Manufacture. Use of Solid Catalyst, Technip, Paris (1987). pp. 75-123.
Perego et al. "Catalyst preparation methods." Catalysis Today 34.3-4 (1997). pp. 281-305.

*Primary Examiner* — Elizabeth D Wood
(74) *Attorney, Agent, or Firm* — Leason Ellis LLP

(57) ABSTRACT

Methods of solid catalyst manufacture using a peptization agent, a peptization agent, and formed solid catalyst materials are provided. The peptization agent includes one or more oxidized disulfide oil ("ODSO") compounds. These ODSO compounds peptization agents are used to replace conventional acids used as peptization agents.

20 Claims, 3 Drawing Sheets

PEPTIZATION AGENT AND SOLID CATALYST MANUFACTURING METHOD

FIELD OF THE DISCLOSURE

The present disclosure relates in general to a peptization agent for use in solid catalyst manufacture, and methods of solid catalyst manufacture using a peptization agent.

BACKGROUND OF THE DISCLOSURE

Solid catalyst manufacturing processes, which can vary considerably from one catalyst to another, include bulk catalysts and supports, and impregnated catalysts starting from preformed supports.

Typical catalyst preparation or manufacturing steps are: precipitation, hydrothermal transformation, decantation, filtration, centrifugation, washing, drying, crushing and grinding, sieving, kneading/mulling, and forming operations. The formed particles can be subjected to thermal treatment, calcination. In certain embodiments, catalytically active materials are impregnated on the surface of, and/or within the pores of, the bulk catalyst particles and/or catalyst support particles.

Precipitation involves the mixing of solutions or suspension of materials, resulting in the formation of a precipitate, which may be crystalline or amorphous. Kneading/mulling of wet solid materials usually leads to the formation of dough that is subsequently formed and dried. Often kneaded/mulled product is subjected to thermal treatment to obtain more intimate contact between components and better homogeneity by thermal diffusion and solid-state reactions. In certain catalyst particles, catalytically active materials (such as one or more active metal components, which varies widely depending on the application) are subsequently added by impregnation or incipient wetting methods.

The support characteristics determine the mechanical properties of the catalyst, such as attrition resistance, hardness, and crushing strength. High surface area and proper pore-size distribution are generally required. The pore-size distribution and other physical properties of a catalyst support prepared by precipitation are also affected by the precipitation and the aging conditions of the precipitate as well as by subsequent drying and forming, and optionally calcining.

The final shape and size of catalyst particles are determined in the forming step. Catalysts and catalyst supports are formed into several possible shapes such as spheres, cylindrical extrudates, or shaped forms such as a trilobes or a quadrilobes. Spherical catalyst support catalyst can be obtained by "oil dropping," whereby precipitation occurs upon the pouring of a liquid into a second immiscible liquid. Other spherical processes include marmurizing. Non spherical shapes are obtained by mixing raw materials to form an extrudable dough which is extruded through a die with perforations. The "spaghetti" extrudate is dried, calcined, and broken into short pieces. The typical length to diameter ratio of the catalyst base varies, for instance, between 2 and 4.

In the forming steps, typically inert materials are used as binders. Such binder materials are used to increase the post-compression adhesion, and facilitate making the catalyst particles in a desired form. In this forming step, acids such as hydrochloric acid, sulfuric acid, nitric acid or acetic acid are used as peptization agents to deagglomerate the particles.

Within a typical refinery, there are by-product streams that must be treated or otherwise disposed of. The mercaptan oxidation process, commonly referred to as the MEROX process, has long been employed for the removal of the generally foul smelling mercaptans found in many hydrocarbon streams and was introduced in the refining industry over fifty years ago. Because of regulatory requirements for the reduction of the sulfur content of fuels for environmental reasons, refineries have been, and continue to be faced with the disposal of large volumes of sulfur-containing by-products. Disulfide oil (DSO) compounds are produced as a by-product of the MEROX process in which the mercaptans are removed from any of a variety of petroleum streams including liquefied petroleum gas, naphtha, and other hydrocarbon fractions. It is commonly referred to as a 'sweetening process' because it removes the sour or foul smelling mercaptans present in crude petroleum. The term "DSO" is used for convenience in this description and in the claims, and will be understood to include the mixture of disulfide oils produced as by-products of the mercaptan oxidation process. Examples of DSO include dimethyldisulfide, diethyldisulfide, and methylethyldisulfide.

The by-product DSO compounds produced by the MEROX unit can be processed and/or disposed of during the operation of various other refinery units. For example, DSO can be added to the fuel oil pool at the expense of a resulting higher sulfur content of the pool. DSO can be processed in a hydrotreating/hydrocracking unit at the expense of higher hydrogen consumption. DSO also has an unpleasant foul or sour smell, which is somewhat less prevalent because of its relatively lower vapor pressure at ambient temperature; however, problems exist in the handling of this oil.

Commonly owned U.S. Pat. No. 10,807,947 which is incorporated by reference herein in its entirety discloses a controlled catalytic oxidation of MEROX process by-products DSO. The resulting oxidized material is referred to as oxidized disulfide oil (ODSO). As disclosed in 10,807,947, the by-product DSO compounds from the mercaptan oxidation process can be oxidized, in the presence of a catalyst. The oxidation reaction products constitute an abundant source of ODSO compounds, sulfoxides, sulfonates, sulfinates and sulfones.

The ODSO stream co-produced contains ODSO compounds as disclosed in U.S. Pat. No. 10,781,168 as a solvent (in general), in U.S. Pat. No. 10,793,782 as an aromatics extraction solvent, and in U.S. Pat. No. 10,927,318 as a lubricity additive, all of which are incorporated by reference herein in their entireties. In the event that a refiner has produced or has on hand an amount of DSO compounds that is in excess of foreseeable needs for these or other uses, the refiner may wish to dispose of the DSO compounds in order to clear a storage vessel and/or eliminate the product from inventory for tax reasons.

Thus, there is a clear and long-standing need to provide an efficient and economical process for the treatment of the large volumes of DSO by-products and their derivatives to effect and modify their properties in order to facilitate and simplify their environmentally acceptable disposal, and to utilize the modified products in an economically and environmentally friendly manner, and thereby enhance the value of this class of by-products to the refiner.

In regard to the above background information, the present disclosure is directed to provide a technical solution for an effective peptization agent used in the manufacture of solid catalyst particles and/or solid catalyst support particles.

SUMMARY OF THE DISCLOSURE

In certain embodiments a composition comprises a peptization agent used to peptize a mixture of solid catalyst components in manufacture of solid catalyst particles and/or solid catalyst support particles, where the composition includes one or more ODSO compounds. In certain embodiments composition comprises a mixture of solid catalyst components and a peptization agent including one or more ODSO compounds. In certain embodiments composition comprises a first intermediate composition comprising one or more base catalyst materials and/or one or more base catalyst support materials, a second intermediate composition comprising one or more inorganic oxide materials, and a peptization agent including one or more ODSO compounds.

In certain embodiments a method for manufacture of solid catalyst particles and/or solid catalyst support particles is provided, comprising contacting a mixture of solid catalyst components with an effective quantity of the peptization agent including one or more ODSO compounds to form a peptized composite, and forming solid catalyst particles and/or solid catalyst support particles from the composite.

In certain embodiments a method for manufacture of solid catalyst particles and/or solid catalyst support particles is disclosed, comprising: providing a first intermediate composition comprising one or more base catalyst materials and/or one or more base catalyst support materials. A second intermediate composition is provided comprising one or more inorganic oxide materials. The first and second intermediate compositions are mixed, and the admixture is contacted with an effective quantity of a peptization agent including one or more ODSO compounds to form a peptized composite. Solid catalyst particles and/or solid catalyst support particles are formed from the composite.

In certain embodiments, solid catalyst particles and/or solid catalyst support particles formed according to the above method are provided, containing sulfur from the ODSO within the particles. In certain embodiments, the so-formed solid catalyst particles and/or solid catalyst support particles exhibit similar crush strength compared to analogous solid catalyst particles and/or solid catalyst support particles formed with conventional peptization agents.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments, and serve to explain principles and operations of the described and claimed aspects and embodiments. Any combinations of the various embodiments and implementations disclosed herein can be used. These and other aspects and features can be appreciated from the following description of certain embodiments and the accompanying drawings and claims.

BRIEF DESCRIPTION OF THE DRAWINGS

The process of the disclosure will be described in more detail below and with reference to the attached drawings.

DETAILED DESCRIPTION OF CERTAIN EMBODIMENTS OF THE DISCLOSURE

Methods of solid catalyst manufacture using a peptization agent, a peptization agent, and formed solid catalyst materials are provided. The peptization agent includes one or more ODSO compounds that replace conventional acids used as peptization agents.

Embodiments of the present disclosure are directed to a peptization agent used in the manufacture of solid catalyst particles and/or solid catalyst support particles comprising, consisting of or consisting essentially of: (a) one or more ODSO compounds; (b) ODSO compounds present in an effluent refinery hydrocarbon stream recovered following catalytic oxidation of mercaptans present in a petroleum feedstream; (c) non-polar water-insoluble ODSO compounds present in an effluent refinery hydrocarbon stream recovered following catalytic oxidation of mercaptans present in a petroleum feedstream; and/or (d) polar water-soluble ODSO compounds present in an effluent refinery hydrocarbon stream recovered following catalytic oxidation of mercaptans present in a petroleum feedstream.

Embodiments of the present disclosure are directed to method of manufacturing solid catalyst particles and/or solid catalyst support particles including: providing one or more solid base catalyst materials and/or solid base catalyst support materials; providing a solid inorganic oxide material; thoroughly mixing the solid materials to form an intimate mixture; and contacting the intimate mixture with the herein described peptization agent to provide a peptized composite. The term "solid catalyst particles" refers to particles that have inherent catalytic properties, such as acidic zeolites. The term "solid catalyst support particles" refers to typically inert support materials. In certain embodiments, active component materials can be incorporated in with the solid mixture of base materials and the inorganic oxide material. The solid catalyst particles and/or solid catalyst support particles formed using the described peptization agent include quantities of sulfur within the final composition. The solid catalyst particles and/or solid catalyst support particles formed using the described peptization agent exhibits similar crush strength as compared to analogous solid catalyst particles and/or solid catalyst support particles formed with conventional peptization agents. By "analogous solid catalyst particles and/or solid catalyst support particles formed with conventional peptization agents" it is intended to describe the equivalent proportions of all materials with the exception of the peptization agents. While not wishing to be bound by theory, the sulfur in ODSO remains in the extrudate due to reaction with inorganic oxides such as alumina, amorphous silica alumina and/or zeolites to enhance binding compared to conventional peptization agents.

Figure 1:
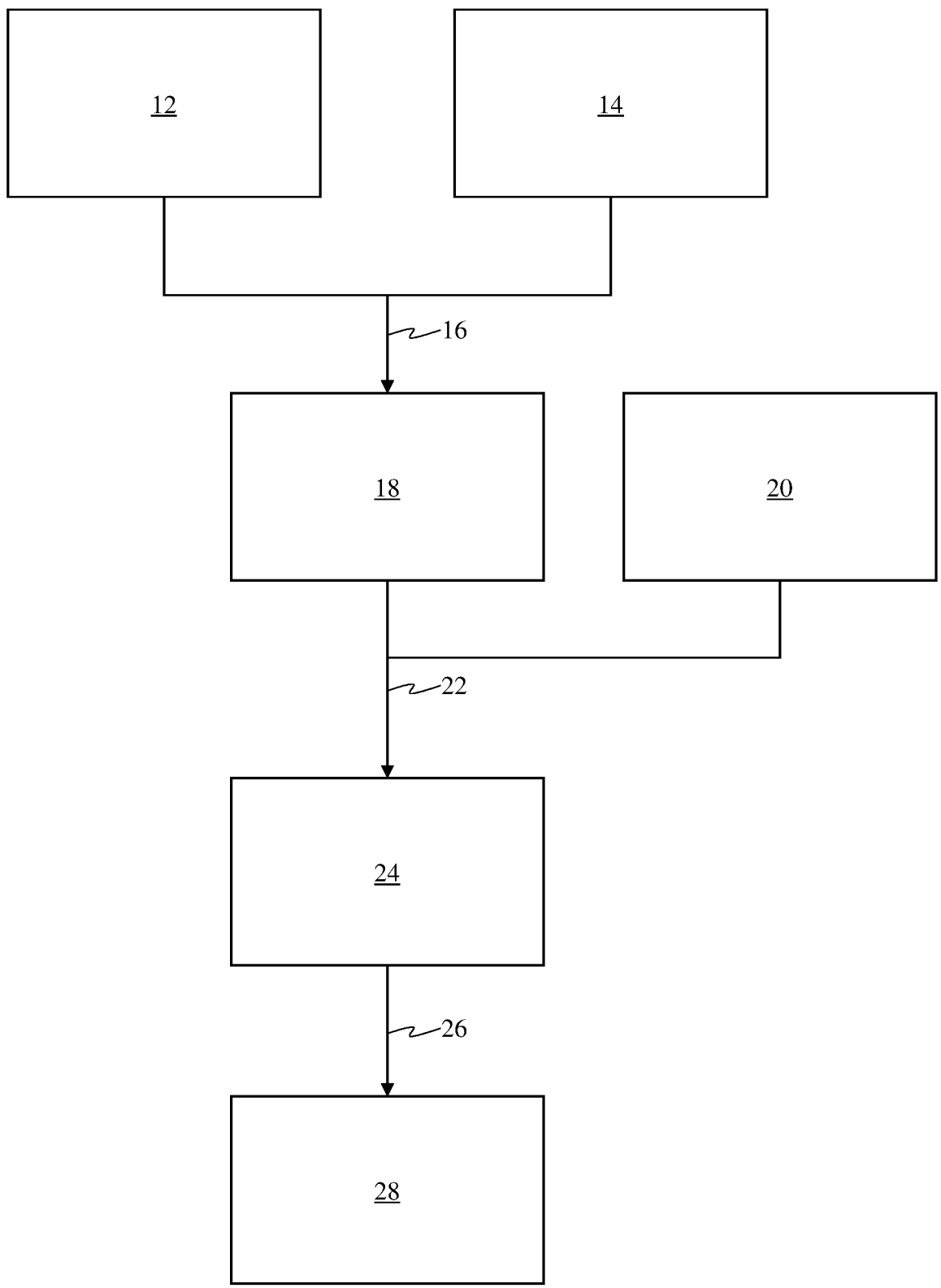
FIG. 1 is a simplified schematic flow chart of a solid catalyst manufacturing process.

FIG. 1 shows a simplified schematic flow chart of a solid catalyst manufacturing process. One or more solid base catalyst materials and/or solid base catalyst support materials 12 and one or more inorganic oxide materials 14 are provided, which are mixed 16 to form a mixture 18. One or more base peptization agents 20 are provided, which is mixed and mulled 22 with the mixture 18 to produce a composite 24. The composite 24 is formed 26 into solid catalyst particles 28 and/or solid catalyst support particles 28. Not shown but readily apparent to those of ordinary skill in the art are additional steps that are used in certain known catalyst manufacturing processes, including one or more additional steps of calcining the solid catalyst particles 28 and/or solid catalyst support particles 28; impregnating the calcined particles with an active metal component; and/or calcining the impregnated particles to form the final catalyst product.

As with known catalyst manufacturing processes, final shapes and sizes of catalyst particles are determined in the forming step 26. Catalysts and catalyst supports are formed into several possible shapes such as spheres, spheroids, cylindrical extrudates, or shaped forms such as a trilobes or a quadrilobes, using for instance suitable dies. Spherical or spheroidal particles are be obtained by drop coagulation (also known as "oil dropping"), whereby precipitation occurs upon the pouring of a liquid into a second immiscible liquid. Other spherical or spheroidal processes include marmurizing and spheronization after extrusion. Non spherical shapes can be obtained by extrusion. For example, the composite 24 can be in the form of a wet extrudable dough or paste, which is extruded through a die with perforations, and the extrudate is dried, calcined, and broken into short pieces as the particles 28, for example with a length to diameter particle ratio in the range of between about 1.5-8, 1.5-5, 2-8, 2-5 and 2-4.

When preparing a composite 24, the one or more base catalyst materials 12 and/or one or more base catalyst support materials 12, for example which can be one or more of a zeolite, amorphous alumina silicate, silica, and/or metal salts, are bounded together with the one or more inorganic oxide materials 14 before being extruded. In typical catalyst and catalyst support manufacturing processes, binder materials formed of inorganic oxide and peptization agents are added to increase the post-compression adhesion, and facilitate making the catalyst particles in a desired form. In the process herein, one or more peptization agents 20 are added to the mixture 18 to deagglomerate the particles. In some embodiments, the peptization agents peptize the surface of inorganic oxide particles, such as alumina, which promotes a hydrogel film; hence interparticle sintering is facilitated during calcination. In some embodiments, the peptization agents peptize the surface of more base catalyst materials 12 and/or one or more base catalyst support materials 12, such as zeolite, amorphous silica-alumina or silica, which promotes a hydrogel film; hence interparticle sintering is facilitated during calcination.

In one embodiment, the peptization agent 20 is mixed 22 with the mixture 18 to form an extrusion dough or paste as the composite 24. Additional water such as deionized water can be added during the dough preparation. The dough is then formed 26 by extrusion, whereby catalyst particles 28 in pellet form are recovered after suitable cutting, drying and optionally subsequent catalyst preparation steps.

In conventional processes peptization agents are an acid such as hydrochloric acid, sulfuric acid, nitric acid or acetic acid. In the process of the present disclosure, a peptization agent used in the manufacture of solid catalyst particles and/or solid catalyst support particles comprising, consisting of or consisting essentially of: (a) one or more ODSO compounds; (b) ODSO compounds present in an effluent refinery hydrocarbon stream recovered following catalytic oxidation of mercaptans present in a petroleum feedstream; (c) non-polar water-insoluble ODSO compounds present in an effluent refinery hydrocarbon stream recovered following catalytic oxidation of mercaptans present in a petroleum feedstream; and/or (d) polar water-soluble ODSO compounds present in an effluent refinery hydrocarbon stream recovered following catalytic oxidation of mercaptans present in a petroleum feedstream.

As is known in the field of manufacturing base catalyst materials and/or base catalyst support materials, additional components can be added to the paste or dough, including but not limited to plasticizing agents such as starches or cellulose ethers (for example commercially available under the trade name Methocel® from DuPont), or lubricating agents. Further, the binder material can be combined with porogenic materials that are dissolved or sintered after final formation of the catalyst particles to create pores.

Inorganic oxides that used in the related art of catalyst manufacture can be used. Examples thereof include alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, and silica-alumina-zirconia. In certain embodiments, the inorganic oxide contains alumina, and its can be provided in a form including, without limitation, one or more of aluminum colloids, aluminates, boehmites, pseudo-boehmites, aluminum salts such as aluminum nitrate, aluminum sulfate and alumina chloride, aluminum hydroxides and alkoxides, aluminum wire and alumina gels. For example, suitable materials as alumina sources are commercially available from Sasol, for instance high purity aluminas (CERALOX) and alumina hydrates (PURAL and CATAPAL), boehmites (DISPERSAL and DISPAL), and silica-alumina hydrates (SIRAL) and the corresponding oxides (SIRALOX).

In certain embodiments, the one or more base catalyst materials and/or one or more base catalyst support materials comprises, consists of or consists essentially of zeolitic material, which are crystalline alumino-silicates. Hundreds of natural and synthetic zeolite framework types exist, and have many different applications. Zeolites are generally hydrated aluminum silicates that can be made or selected with a controlled porosity and other characteristics. Certain types of zeolites find application in various chemical reactions, for instance hydrocracking, hydrogenation, and isomerization processes in petroleum refineries. The zeolite pores can form sites for catalytic reactions, and can also form channels that are selective for the passage of certain compounds and/or isomers to the exclusion of others. Zeolites can also possess an acidity level that enhances its efficacy as a catalytic material or adsorbent, alone or with the addition of active components. Suitable zeolitic materials include those identified by the International Zeolite Association, including those with the identifiers ABW, ACO, AEI, AEL, AEN, AET, AFG, AFI, AFN, AFO, AFR, AFS, AFT, AFV, AFX, AFY, AHT, ANA, ANO, APC, APD, AST, ASV, ATN, ATO, ATS, ATT, ATV, AVE, AVL, AWO, AWW, BCT, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETL, ETR, ETV, EUO, EWO, EWS, EZT, FAR, FAU, FER, FRA, GIS, GIU, GME, GON, GOO, HEU, IFO, IFR, -IFT, -IFU, IFW, IFY, IHW, IMF, IRN, IRR, -IRY, ISV, ITE, ITG, ITH, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, MRT, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POR, POS, PSI, PTO, PTT, PTY, PUN, PWN, PWO, PWW, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, SFW, SGT, SIV, SOD, SOF, SOR, SOS, SOV, SSF, SSY, STF, STI, STT, STW, -SVR, SVV, SWY, -SYT, SZR, TER, THO, TOL, TON, TSC, TUN, UEI, UFI, UOS, UOV, UOZ, USI, UTL, UWY, VET, VFI, VNI, VSV, WEI, -WEN, YFI, YUG, ZON, *BEA, *CTH, *-EWT, *-ITN, *MRE, *PCS, *SFV, *-SSO, *STO, *-SVY, *UOE. For example, certain known zeolites used in the petroleum refining industry include but are not limited to mordenite, ZSM-5, ZSM-11, ZSM-12, ZSM-22, ZSM-23, ZSM-35, beta-type (*BEA), Y, USY, and MCM zeolites such as MCM-41 and MCM-48. For example, these can be (FAU) framework, which includes USY, having a micropore size related to the 12-member ring when viewed along the [111] direction of 7.4×7.4 Å; (MFI) framework, which includes ZSM-5, having a micropore size related to the 10-member rings when viewed along the [100] and [010] directions of 5.5×5.1 Å and 5.6×5.3 Å, respectively; (MEL) framework, which includes ZSM-11, having a micropore size related to the 10-member ring when viewed along the [100] direction of 5.4×5.3 Å; (MTW) framework, which includes ZSM-12, having a micropore size related to the 12-member ring when viewed along the [010] direction of 5.6×6.0 Å; (TON) framework, which includes ZSM-12, having a micropore size related to the 10-member ring when viewed along the [001] direction of 4.6×5.7 Å; (MTT) framework, which includes ZSM-23, having a micropore size related to the 10-member ring when viewed along the [001] direction of 4.5×5.2 Å; (FER) framework, which includes ZSM-35, having a micropore size related to the 10-member ring and 8-member ring when viewed along the [001] and [010] directions of 4.2×5.4 Å and 3.5×4.8 Å, respectively; (MOR) framework, which includes mordenite zeolites, having a micropore size related to the 12-member ring and 8-member ring when viewed along the [001] and [001] directions of 6.5×7.0 Å and 2.6×5.7 Å, respectively; and (*BEA) framework, which includes zeolite beta polymorph A, having a micropore size related to the 12-member rings when viewed along the [100] and [001] directions of 6.6×6.7 Å and 5.6×5.6 Å, respectively. Zeolite-type materials are also known, such as crystalline silico-alumino-phosphate (SAPO) or alumino-phosphate (AlPO) materials.

In certain embodiments, the one or more base catalyst materials and/or one or more base catalyst support materials comprises, consists of or consists essentially of amorphous silica-alumina (ASA). ASA can be used as a catalytic material, or a support or co-support for a catalytic material, in many commercial applications. Numerous methods of manufacturing ASA are known, and it is appreciated that the physical and catalytic properties of ASA can be highly dependent upon the method by which it is manufactured. Conventional processes for making ASA are known, for example as disclosed in U.S. Pat. Nos. 4,500,645, 8,795,513 and 6,399,530, all of which are incorporated by reference herein in their entireties.

In certain embodiments, the one or more base catalyst materials and/or one or more base catalyst support materials comprises, consists of or consists essentially of silica. The silica source can comprise, without limitation, one or more of silicates including sodium silicate (water glass), rice husk, fumed silica, precipitated silica, colloidal silica, silica gels, other zeolites, dealuminated zeolites, and silicon hydroxides and alkoxides. Silica sources resulting in a high relative yield are suitable. For instance, suitable materials as silica sources are commercially available from Cabot (for example, fumed silica) and Ludox (for example, colloidal silica).

In certain embodiments, the one or more base catalyst materials and/or one or more base catalyst support materials comprises, consists of or consists essentially of metal salts. Suitable metal salts include but are not limited to titanium oxide, zirconium oxide, alumina phosphate or magnesium oxide.

Certain ratios of materials are provided to attain the effective quantities of components as is known in catalyst manufacturing. The one or more base catalyst materials and/or one or more base catalyst support materials can comprise about 1-99, 1-90, 1-80, 1-50, 1-25, 5-99, 5-90, 5-80, 5-50, 5-25, 10-99, 10-90, 10-80, 10-50 or 1-25 mass percent of the total finished catalyst particles, with the remainder being the inorganic oxide material and the peptization agent.

The solid catalyst particles and/or solid catalyst support particles formed according to the process herein is a composite of (i) one or more base catalyst materials and/or base catalyst support materials and (ii) a peptized binder material, wherein the peptization agent comprises, consists of or consists essentially of ODSO or a mixture of ODSO compounds. In certain embodiments, the solid catalyst particles and/or solid catalyst support particles formed herein have an average dimension of about 0.1-5, 0.5-5, 1-5, 0.1-3, 0.5-3 or 1-3 millimeters (for instance a diameter dimension, where the particles are extrudates with a length to diameter ratio in the range of between about 1.5-8, 1.5-5, 2-8, 2-5 and 2-4). In certain embodiments, the solid catalyst particles and/or solid catalyst support particles formed herein have an average radial crush strength (as determined by ASTM D6175-03) is in the range of about 20-40 or 20-30 Newtons (N) per millimeter. "Radial crush strength" is the force required to fracture or crush a material, such as the formed (e.g., extruded) catalyst or catalyst support particles with compression on the sides.

Example embodiments of the present disclosure are directed to one or more ODSO compounds that are used as peptization agents. The peptization agents can be a mixture that comprises two or more ODSO compounds. In the description herein, the terms "oxidized disulfide oil", "ODSO", "ODSO mixture" "ODSO composition" and "ODSO compound(s)" may be used interchangeably for convenience. As used herein, the abbreviations of oxidized disulfide oils ("ODSO") and disulfide oils ("DSO") will be understood to refer to the singular and plural forms, which may also appear as "DSO compounds" and "ODSO compounds," and each form may be used interchangeably. In certain instances, a singular ODSO compound may also be referenced.

In certain embodiments, an effective amount of ODSO as peptization agent herein can be quantified on as a mass ratio of ODSO to the binder materials (volatile free), in the range of about 1:1 to 1:1000, 1:1 to 1:500, 1:1 to 1:100, 1:1 to 1:50, 1:1 to 1:20, 1:1 to 1:10, 1:2 to 1:1000, 1:2 to 1:500, 1:2 to 1:100, 1:2 to 1:50, 1:2 to 1:20 or 1:2 to 1:10. Volatile free mass is defined as the actual mass of the solid materials without considering the volatile fraction. In the examples used herein, the volatile free mass is the mass after exposing the material to dry air at 600° C. for 1 hour.

In certain embodiments, an effective amount of ODSO as peptization agent herein can be quantified as a peptization level, quantity of peptization agent (dry mass) to the quantity of total solid materials in the extrusion dough (volatile free mass) including the (1) inorganic oxide material and (2)

zeolite or other base catalyst materials and/or base catalyst support materials. An effective amount of ODSO as peptization agent in the embodiments herein include quantities that result in a suitable peptization level, for instance between about 0.1-50, 0.1-40, 0.1-25, 0.2-50, 0.2-40, 0.2-25, 0.5-50, 0.5-40, 0.5-25, 1-50, 1-40 or 1-25%.

In certain embodiments, ODSO is used as a peptization agent in a pure undiluted state. In certain embodiments, ODSO mixed with water to generate a peptization solution. For example, the mass ratio of ODSO to water in the peptization agent solution is in the range of about 100:0 to 0.1:99.9, 100:0 to 1:99, 100:0 to 5:95, 100:0 to 10:90, 100:0 to 20:80 or 100:0 to 50:50.

In certain embodiments, the peptization agent comprises, consists of or consists essentially of ODSO in the presence of water. In certain embodiments, the peptization agent comprises, consists of or consists essentially of ODSO, and wherein water is provided to the binder/peptization agent in a separate step. In certain embodiments, the peptization agent comprises ODSO in combination with one or more other known peptization agents, that is, conventional acids such as hydrofluoric acid, hydrochloric acid, sulfuric acid, nitric acid, aqua regia (a mixture of nitric acid and hydrochloric acid, optimally in a molar ratio of nitric:hydrochloric of 1:3) or acetic acid. Accordingly, the total peptization agent solution mass ratio of ODSO to conventional acid (excluding water) is in the range of about 100:0 to 0.1:99.9, 100:0 to 1:99, 100:0 to 5:95, 100:0 to 10:90, 100:0 to 20:80 or 100:0 to 50:50.

In certain embodiments, the ODSO compounds used as the peptization agent or as a component thereof are obtained from controlled catalytic oxidation of disulfide oils from mercaptan oxidation processes. The effluents from controlled catalytic oxidation of disulfide oils from mercaptan oxidation processes includes ODSO compounds and in certain embodiments DSO compounds that were unconverted in the oxidation process. In certain embodiments this effluent contains water-soluble compounds and water-insoluble compounds. The effluent contains at least one ODSO compound, or a mixture of two or more ODSO compounds, selected from the group consisting of compounds having the general formula (R—SO—S—R'), (R—SOO—S—R'), (R—SOO—SO—R'), (R—SOO—SOO—R'), (R—SO—SO—R'), (R—SO—SOO—OH), (R—SOO—SOO—OH), (R—SO—SO—OH), (R—SOO—SO—OH), (R—SO—SO—OR'), (R—SOO—SO—OR'), (R—SO—SOO—OR') and (R—SOO—SOO—OR'). In certain embodiments, in the above formula R and R' can be the same or different C1-C10 alkyl or C6-C10 aryl. It will be understood that since the source of the DSO is a refinery feedstream, the R substituent vary, e.g., methyl and ethyl subgroups, and the number of sulfur atoms, S, in the as-received feedstream to oxidation can extend to 3, for example, trisulfide compounds.

In certain embodiments the water-soluble compounds and water-insoluble compounds are separated from one another, and the ODSO acid or ODSO acid mixture comprise all or a portion of the water-soluble compounds separated from the total effluents from oxidation of disulfide oils from mercaptan oxidation processes. For example, the different phases can be separated by decantation or partitioning with a separating funnel, separation drum, by decantation, or any other known apparatus or process for separating two immiscible phases from one another. In certain embodiments, the water-soluble and water-insoluble components can be separated by distillation as they have different boiling point ranges. It is understood that there will be crossover of the water-soluble and water-insoluble components in each fraction due to solubility of components, typically in the ppmw range (for instance, about 1-10,000, 1-1,000, 1-500 or 1-200 ppmw). In certain embodiments, contaminants from each phase can be removed, for example by stripping or adsorption.

In certain embodiments the peptization agent used herein in the manufacture of solid catalyst particles and/or solid catalyst support particles comprises, consists of or consists essentially of at least one ODSO compound that is selected from the group consisting of compounds having the general formula (R—SO—S—R'), (R—SOO—S—R'), (R—SOO—SO—R'), (R—SOO—SOO—R'), (R—SO—SO—R'), (R—SO—SOO—OH), (R—SOO—SOO—OH), (R—SO—SO—OH), (R—SOO—SO—OH), (R—SO—SO—OR'), (R—SOO—SO—OR'), (R—SO—SOO—OR') and (R—SOO—SOO—OR'). In certain embodiments the peptization agent herein comprises, consists of or consists essentially of a mixture of two or more ODSO compounds that is selected from the group consisting of compounds having the general formula (R—SO—S—R'), (R—SOO—S—R'), (R—SOO—SO—R'), (R—SOO—SOO—R'), (R—SO—SO—R'), (R—SO—SOO—OH), (R—SOO—SOO—OH), (R—SO—SO—OH), (R—SOO—SO—OH), (R—SO—SO—OR'), (R—SOO—SO—OR'), (R—SO—SOO—OR') and (R—SOO—SOO—OR'). In certain embodiments the peptization agent herein comprises, consists of or consists essentially of at least one water-soluble ODSO compound that is selected from the group consisting of compounds having the general formula (R—SOO—SO—R'), (R—SOO—SOO—R'), (R—SO—SOO—OH), (R—SOO—SOO—OH), (R—SOO—SO—OH), (R—SO—SO—OR'), (R—SOO—SO—OR'), (R—SO—SOO—OR') and (R—SOO—SOO—OR'). In certain embodiments a peptization agent herein comprises, consists of or consists essentially of a mixture of two or more water-soluble ODSO compounds that is selected from the group consisting of compounds having the general formula (R—SOO—SO—R'), (R—SOO—SOO—R'), (R—SO—SOO—OH), (R—SOO—SOO—OH), (R—SOO—SO—OH), (R—SO—SO—OR'), (R—SOO—SO—OR'), (R—SO—SOO—OR') and (R—SOO—SOO—OR'). In certain embodiments the ODSO compounds are selected from the group consisting of (R—SOO—SO—R'), (R—SOO—SOO—R'), (R—SO—SOO—OH), (R—SOO—SOO—OH), (R—SO—SO—OH), (R—SOO—SO—OH), and mixtures thereof. In certain embodiments, in the above formulae R and R' can be the same or different C1-C10 alkyl or C6-C10 aryl. In certain embodiments, the ODSO compound(s) used as a peptization agent have 1 to 20 carbon atoms.

In certain embodiments, a peptization agent disclosed and used herein comprises, consists of or consists essentially of ODSO compounds having an average density greater than about 1.0 g/cc. In certain embodiments, a peptization agent disclosed and used herein comprises, consists of or consists essentially of ODSO compounds having an average boiling point greater than about 80° C. In certain embodiments, a peptization agent disclosed and used herein comprises, consists of or consists essentially of ODSO compounds having a dielectric constant that is less than or equal to 100 at 0° C.

Table 1 includes examples of ODSO compounds. ODSO compounds that contain 1 and 2 oxygen atoms are non-polar and water-insoluble. ODSO compounds that contain 3 or more oxygen atoms are water-soluble. The production of either polar or non-polar ODSO compounds is in part dependent on the reaction conditions during the oxidation process. The ODSO compounds that contain 3 or more oxygen atoms are water-soluble over effectively all concentrations, for instance, with some minor amount of acceptable tolerance for carry over components from the effluent stream and in the water-insoluble fraction with 2 oxygen atoms of no more than about 1, 3 or 5 mass percent.

In certain embodiments of the disclosed peptization agents, all or a portion of mixtures formed by the controlled catalytic oxidation of MEROX process by-products DSO disclosed in 10,807,947 discussed above, are highly effective as peptization agents in the manufacture and used herein correspond to oxidized DSO compounds present in an effluent refinery hydrocarbon stream recovered following the catalytic oxidation of mercaptans present in the hydrocarbon stream. In some embodiments, the DSO compounds are oxidized in the presence of a catalyst.

As noted above, the designation "MEROX" originates from the function of the process itself, that is, the conversion of mercaptans by oxidation. The MEROX process in all of its applications is based on the ability of an organometallic catalyst in a basic environment, such as a caustic, to accelerate the oxidation of mercaptans to disulfides at near ambient temperatures and pressures. The overall reaction can be expressed as follows:

$$RSH + \tfrac{1}{4}O_2 \rightarrow \tfrac{1}{2}RSSR + \tfrac{1}{2}H_2O \quad (1)$$

where R is a hydrocarbon chain that may be straight, branched, or cyclic, and the chains can be saturated or unsaturated. In most petroleum fractions, there will be a mixture of mercaptans so that the R can have 1, 2, 3 and up to 10 or more carbon atoms in the chain. This variable chain length is indicated by R and R' in the reaction. The reaction is then written:

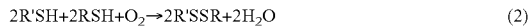

$$2R'SH + 2RSH + O_2 \rightarrow 2R'SSR + 2H_2O \quad (2)$$

This reaction occurs spontaneously whenever any sour mercaptan-bearing distillate is exposed to atmospheric oxygen, but proceeds at a very slow rate. In addition, the catalyzed reaction (1) set forth above requires the presence of an alkali caustic solution, such as aqueous sodium hydroxide. The mercaptan oxidation proceeds at an economically practical rate at moderate refinery downstream temperatures.

The MEROX process can be conducted on both liquid streams and on combined gaseous and liquid streams. In the case of liquid streams, the mercaptans are converted directly to disulfides which remain in the product so that there is no reduction in total sulfur content of the effluent stream. The MEROX process typically utilizes a fixed bed reactor system for liquid streams and is normally employed with charge stocks having end points above 135° C.-150° C. Mercaptans are converted to disulfides in the fixed bed reactor system over a catalyst, for example, an activated charcoal impregnated with the MEROX reagent, and wetted with caustic solution. Air is injected into the hydrocarbon feedstream ahead of the reactor and in passing through the catalyst-impregnated bed, the mercaptans in the feed are oxidized to disulfides. The disulfides are substantially insoluble in the caustic and remain in the hydrocarbon phase. Post treatment is required to remove undesirable by-products resulting from known side reactions such as the neutralization of $H_2S$, the oxidation of phenolic compounds, entrained caustic, and others.

The vapor pressures of disulfides are relatively low compared to those of mercaptans, so that their presence is much less objectionable from the standpoint of odor; however, they are not environmentally acceptable due to their sulfur content and their disposal can be problematical.

In the case of mixed gas and liquid streams, extraction is applied to both phases of the hydrocarbon streams. The degree of completeness of the mercaptan extraction depends upon the solubility of the mercaptans in the alkaline solution, which is a function of the molecular weight of the individual mercaptans, the extent of the branching of the mercaptan molecules, the concentration of the caustic soda and the temperature of the system. Thereafter, the resulting DSO compounds are separated and the caustic solution is regenerated by oxidation with air in the presence of the catalyst and reused.

Figures 2, 3:
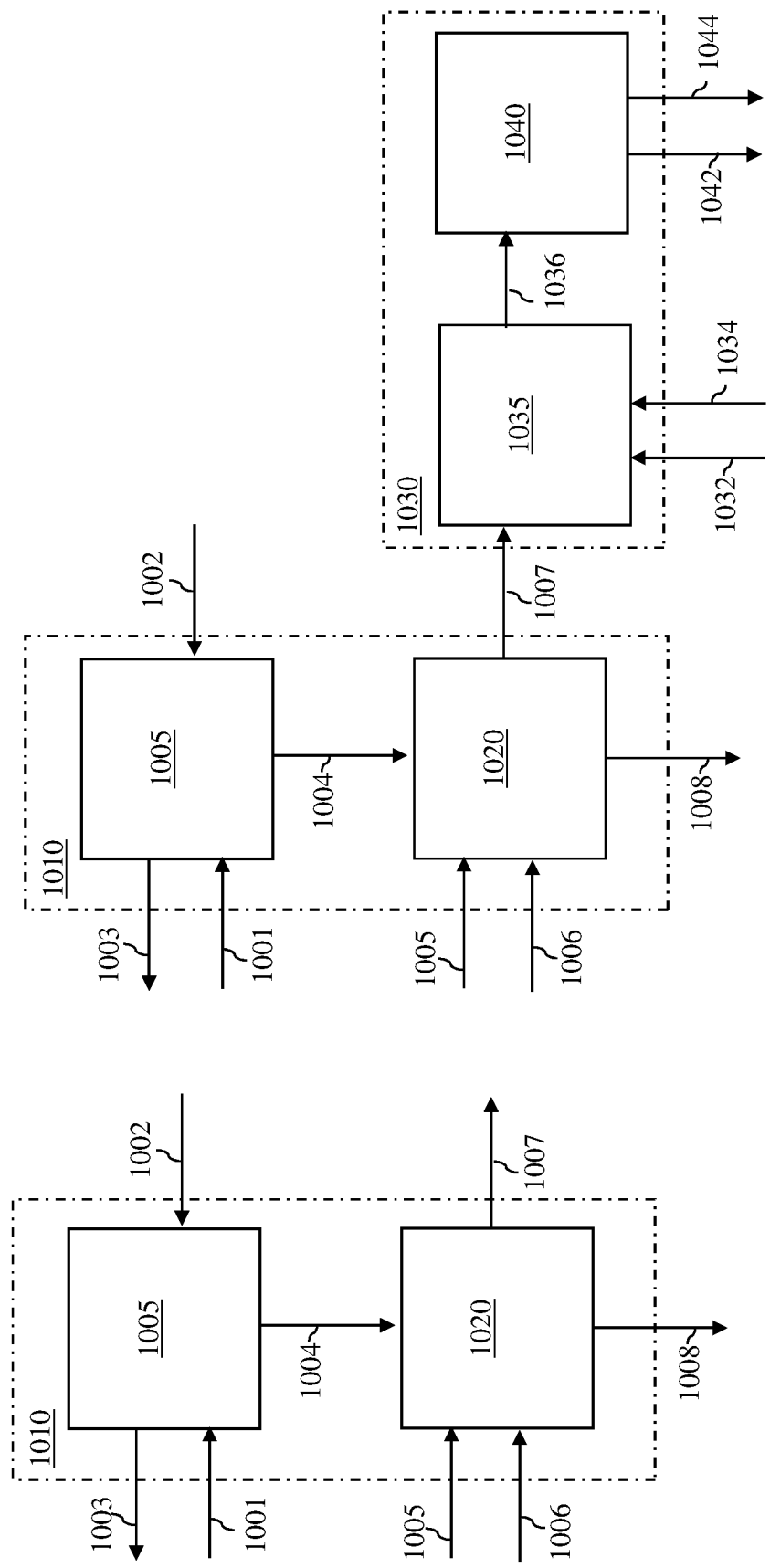
FIG. 2 is a simplified schematic diagram of a generalized version of a conventional mercaptan oxidation or MEROX process for the liquid-liquid extraction of a mercaptan containing hydrocarbon stream.
FIG. 3 is a simplified schematic diagram of a generalized version of an enhanced mercaptan oxidation or E-MEROX process.

Referring to the attached drawings, FIG. 2 is a simplified schematic of a generalized version of a conventional MEROX process employing liquid-liquid extraction for removing sulfur compounds. A MEROX unit 1010, is provided for treating a mercaptan containing hydrocarbon stream 1001. In some embodiments, the mercaptan containing hydrocarbon stream 1001 is LPG, propane, butane, light naphtha, kerosene, jet fuel, or a mixture thereof. The process generally includes the steps of: introducing the hydrocarbon stream 1001 with a homogeneous catalyst into an extraction vessel 1005 containing a caustic solution 1002, in some embodiments, the catalyst is a homogeneous cobalt-based catalyst; passing the hydrocarbon catalyst stream in counter-current flow through the extraction section of the extraction 1005 vessel in which the extraction section includes one or more liquid-liquid contacting extraction decks or trays (not shown) for the catalyzed reaction with the circulating caustic solution to convert the mercaptans to water-soluble alkali metal alkane thiolate compounds; withdrawing a hydrocarbon product stream 1003 that is free or substantially free of mercaptans from the extraction vessel 1005, for instance, having no more than about 1000, 100, 10 or 1 ppmw mercaptans; recovering a combined spent caustic and alkali metal alkane thiolate stream 1004 from the extraction vessel 1005; subjecting the spent caustic and alkali metal alkane thiolate stream 1004 to catalyzed wet air oxidation in a reactor 1020 into which is introduced catalyst 1005 and air 1006 to provide the regenerated spent caustic 1008 and convert the alkali metal alkane thiolate compounds to disulfide oils; and recovering a by-product stream 1007 of DSO compounds and a minor proportion of other sulfides such as mono-sulfides and tri-sulfides. The effluents of the wet air oxidation step in the MEROX process can comprise a minor proportion of sulfides and a major proportion of disulfide oils. As is known to those skilled in the art, the composition of this effluent stream depends on the effectiveness of the MEROX process, and sulfides are assumed to be carried-over material. A variety of catalysts have been developed for the commercial practice of the process. The efficiency of the MEROX process is also a function of the amount of $H_2S$ present in the stream. It is a common refinery practice to install a prewashing step for $H_2S$ removal.

An enhanced MEROX process ("E-MEROX") is a modified MEROX process where an additional step is added, in which DSO compounds are oxidized with an oxidant in the presence of a catalyst to produce a mixture of ODSO compounds. The by-product DSO compounds from the mercaptan oxidation process are oxidized, in some embodiments in the presence of a catalyst, and constitute an abundant source of ODSO compounds that are sulfoxides, sulfonates, sulfinates, sulfones and their corresponding di-sulfur mixtures. The disulfide oils having the general formula RSSR' (wherein R and R' can be the same or different and can have 1, 2, 3 and up to 10 or more carbon atoms) can be oxidized without a catalyst or in the presence of one or more catalysts to produce a mixture of ODSO compounds. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. If a catalyst is used in the oxidation of the disulfide oils having the general formula RSSR' to produce the ODSO compounds, it can be a heterogeneous or homogeneous oxidation catalyst. The oxidation catalyst can be selected from one or more heterogeneous or homogeneous catalyst comprising metals from the IUPAC Group 4-12 of the Periodic Table, including Ti, V, Mn, Co, Fe, Cr, Cu, Zn, W and Mo. The catalyst can be a homogeneous water-soluble compound that is a transition metal containing an active species selected from the group consisting of Mo (VI), W (VI), V (V), Ti (IV), and their combination. In certain embodiments, suitable homogeneous catalysts include molybdenum naphthenate, sodium tungstate, molybdenum hexacarbonyl, tungsten hexacarbonyl, sodium tungstate and vanadium pentoxide. An exemplary catalyst for the controlled catalytic oxidation of MEROX process by-products DSO is sodium tungstate, $Na_2WO_4 \cdot 2H_2O$. In certain embodiments, suitable heterogeneous catalysts include Ti, V, Mn, Co, Fe, Cr, W, Mo, and combinations thereof deposited on a support such as alumina, silica-alumina, silica, natural zeolites, synthetic zeolites, and combinations comprising one or more of the above supports.

The oxidation of DSO typically is carried out in an oxidation vessel selected from one or more of a fixed-bed reactor, an ebullated bed reactor, a slurry bed reactor, a moving bed reactor, a continuous stirred tank reactor, and a tubular reactor. The ODSO compounds produced in the E-MEROX process generally comprise two phases: a water-soluble phase and water-insoluble phase, and can be separated into the aqueous phase containing water-soluble ODSO compounds and a non-aqueous phase containing water-insoluble ODSO compounds. The E-MEROX process can be tuned depending on the desired ratio of water-soluble to water-insoluble compounds presented in the product ODSO mixture. Partial oxidation of DSO compounds results in a higher relative amount of water-insoluble ODSO compounds present in the ODSO product and a near or almost complete oxidation of DSO compounds results in a higher relative amount of water-soluble ODSO present in the ODSO product. Details of the ODSO compositions are discussed in the U.S. Pat. No. 10,781,168, which is incorporated herein by reference above.

FIG. 3 is a simplified schematic of an E-MEROX process that includes E-MEROX unit 1030. The MEROX unit 1010 unit operates similarly as in FIG. 2, with similar references numbers representing similar units/feeds. In FIG. 2, the effluent stream 1007 from the generalized MEROX unit of FIG. 2 is treated. It will be understood that the processing of the mercaptan containing hydrocarbon stream of FIG. 2 is illustrative only and that separate streams of the products, and combined or separate streams of other mixed and longer chain products can be the subject of the process for the recovery and oxidation of DSO to produce ODSO compounds, that is the E-MEROX process. In order to practice the E-MEROX process, apparatus are added to recover the by-product DSO compounds from the MEROX process. In addition, a suitable reactor 1035 is added into which the DSO compounds are introduced in the presence of a catalyst 1032 and an oxidant 1034 and subjecting the DSO compounds to a catalytic oxidation step to produce the mixed stream 1036 of water and ODSO compounds. A separation vessel 1040 is provided to separate the by-product 1044 from the ODSO compounds 1042.

The oxidation to produce OSDO can be carried out in a suitable oxidation reaction vessel operating at a pressure in the range from about 1-30, 1-10 or 1-3 bars. The oxidation to produce OSDO can be carried out at a temperature in the range from about 20-300, 20-150, 20-90, 45-300, 15-150 or 45-90° C. The molar feed ratio of oxidizing agent-to-monosulfur can be in the range of from about 1:1 to 100:1, 1:1 to 30:1 or 1:1 to 4:1. The residence time in the reaction vessel can be in the range of from about 5-180, 5-90, 5-30, 15-180, 15-90 or 5-30 minutes. In certain embodiments, oxidation of DSO is carried out in an environment without added water as a reagent. The by-products stream 1044 generally comprises wastewater when hydrogen peroxide is used as the oxidant. Alternatively, when other organic peroxides are used as the oxidant, the by-products stream 1044 generally comprises the alcohol of the peroxide used. For example, if butyl peroxide is used as the oxidant, the by-product alcohol 1044 is butanol.

In certain embodiments water-soluble ODSO compounds are passed to a fractionation zone (not shown) for recovery following their separation from the wastewater fraction. The fractionation zone can include a distillation unit. In certain embodiments, the distillation unit can be a flash distillation unit with no theoretical plates in order to obtain distillation cuts with larger overlaps with each other or, alternatively, on other embodiments, the distillation unit can be a flash distillation unit with at least 15 theoretical plates in order to have effective separation between cuts. In certain embodiments, the distillation unit can operate at atmospheric pressure and at a temperature in the range of from 100° C. to 225° C. In other embodiments, the fractionation can be carried out continuously under vacuum conditions. In those embodiments, fractionation occurs at reduced pressures and at their respective boiling temperatures. For example, at 350 mbar and 10 mbar, the temperature ranges are from 80° C. to 194° C. and 11° C. to 98° C., respectively. Following fractionation, the wastewater is sent to the wastewater pool (not shown) for conventional treatment prior to its disposal. The wastewater by-product fraction can contain a small amount of water-insoluble ODSO compounds, for example, in the range of from 1 ppmw to 10,000 ppmw. The wastewater by-product fraction can contain a small amount of water-soluble ODSO compounds, for example, in the range of from 1 ppmw to 50,000 ppmw, or 100 ppmw to 50,000 ppmw. In embodiments where alcohol is the by-product alcohol, the alcohol can be recovered and sold as a commodity product or added to fuels like gasoline. The alcohol by-product fraction can contain a small amount of water-insoluble ODSO compounds, for example, in the range of from 1 ppmw to 10,000 ppmw. The alcohol by-product fraction can contain a small amount of water-soluble ODSO compounds, for example, in the range of from 100 ppmw to 50,000 ppmw.

The ODSO that is obtained from a low value by-product disulfide oil streams that were previously known as nuisances within a refinery can substitute for acids used as a peptization agent to treat a mixture of solid catalyst components in manufacture of solid catalyst particles and/or solid catalyst support particles. Thus, the refinery waste becomes a useful ingredient in catalyst manufacturing and a valuable industrial commodity, as it eliminates nitric acid or other acids typically used in the process, thereby reducing raw material cost of the catalyst. The solid catalyst particles and/or solid catalyst support particles using ODSO as a peptization agent has similar strength and pressure resistant properties as compared to extrudates prepared with traditional nitric acid as a peptization agent.

EXAMPLES

Comparative Example: A quantity of extrudates (pellets) with volatile-free composition of 48 mass percent alumina (CATAPAL® C1 from Sasol Germany GmbH), 42 mass percent amorphous silica alumina (ASA) (Siral-40, Sasol Chemicals (USA) LLC) and 10 mass percent Y-zeolite (CBV720 from Zeolyst International, USA) was prepared. The solid materials were thoroughly mixed. As peptization agent, a nitric acid solution with concentration of 4 mass percent was used to peptize the powder mixture with peptization level of 4%. The mass ratio of nitric acid solution to the solids (volatile free) to be peptized is 0.31. The nitric acid solution was added slowly to the solid mixture. Extensive mulling and mixing were performed while the nitric acid solution was added. The final mixture was targeted to have weight loss of 55% when calcined at 600° C. for 1 hour. Pellets were prepared by extruding the mixture using a Bonnot extruder equipped with 1/16 inch hole die-plate. The pellets were then calcined in air using a muff oven. Calcination was carried out by: ramping the temperature from room temperature to 100° C. at 5° C./min; holding for 1 hour, ramping to 400° C. at 5° C./min; holding for 1 hour; ramping to 630° C. at 5° C./min; and holding for 1 hour.

Figure 4A:
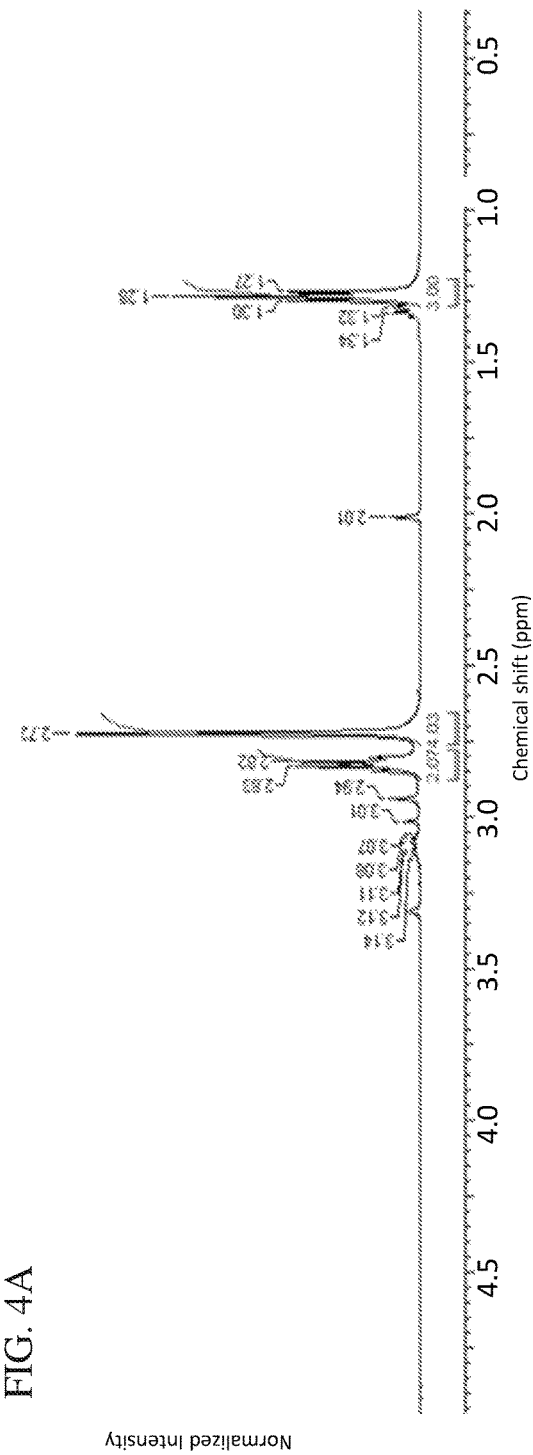
FIG. 4A is the experimental $^1$H-NMR spectrum of the polar, water-soluble solvent composition used in the example herein.
Figure 4B:
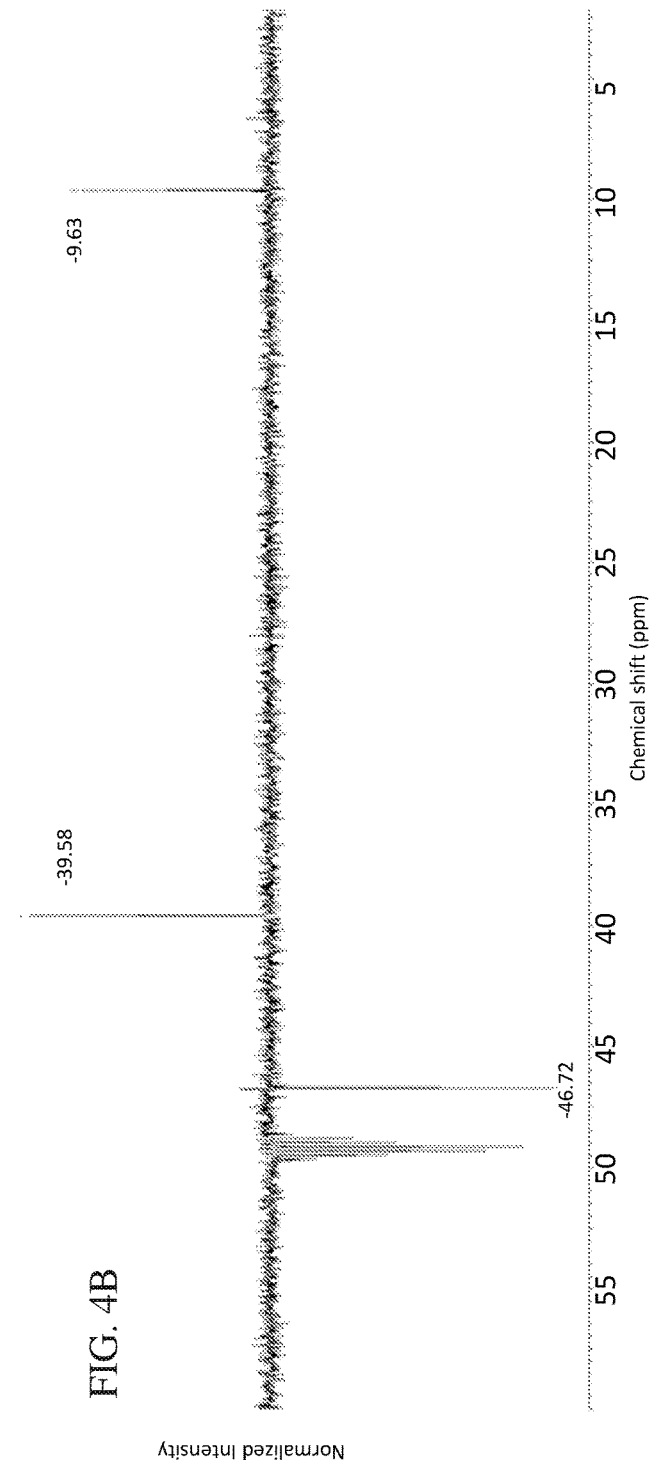
FIG. 4B is the experimental $^{13}$C-DEPT-135-NMR spectrum of the polar, water-soluble solvent composition used in the example herein.

Reference Example ODSO compounds used in Examples 1-3 below were produced as disclosed in U.S. Pat. No. 10,781,168, incorporated by reference above, and in particular the fraction referred to therein as Composition 2. Catalytic oxidation a hydrocarbon refinery feedstock having 98 mass percent of C1 and C2 disulfide oils was carried out. The oxidation of the DSO compounds was performed in batch mode under reflux at atmospheric pressure, that is, approximately 1.01 bar. The hydrogen peroxide oxidant was added at room temperature, that is, approximately 23° C. and produced an exothermic reaction. The molar ratio of oxidant-to-DSO compounds (calculated based upon mono-sulfur content) was 2.40. After the addition of the oxidant was complete, the reaction vessel temperature was set to reflux at 80° C. for approximately one hour. Two immiscible layers formed, one a dark red to brown layer, hereinafter referred to as Composition 1, and a light-yellow layer, hereinafter referred to as Composition 2. A separating funnel was used to separate and isolate each of the two layers. The catalyst used in the oxidation of the DSO compounds was sodium tungstate. The Composition 2, referred to herein as the selected water-soluble ODSO fraction, was used. FIG. 4A is the experimental 1H-NMR spectrum of the polar, water-soluble ODSO mixture that is the selected water-soluble ODSO fraction in the example herein. FIG. 4B is the experimental $^{13}$C-DEPT-135-NMR spectrum of the polar, water-soluble ODSO mixture that is the selected water-soluble ODSO fraction in the example herein. The selected water-soluble ODSO fraction was mixed with a $CD_3OD$ solvent and the spectrum was taken at 25° C. Methyl carbons have a positive intensity while methylene carbons exhibit a negative intensity. The peaks in the 48-50 ppm region belong to carbon signals of the $CD_3OD$ solvent.

When comparing the experimental $^{13}$C-DEPT-135-NMR spectrum of FIG. 4B for the selected water-soluble ODSO fraction with a saved database of predicted spectra, it was found that a combination of the predicted alkyl-sulfoxides-ulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) most closely corresponded to the experimental spectrum. This suggests that alkyl-sulfoxides-ulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) are major compounds in the selected water-soluble ODSO fraction. It is clear from the NMR spectra shown in FIGS. 4A and 4B that the selected water-soluble ODSO fraction comprises a mixture of ODSO compounds that form a peptization solution of the present disclosure.

Example 1: The process of the Comparative Example was followed, except that a different peptization solution was used. The peptization solution was prepared by substituting nitric acid (dry) with equal mole of the selected water-soluble ODSO fraction relative to nitric acid. When calculating the mass of ODSO from moles in the Examples 1-3, an average molecular weight of 160 g/mol is assumed, which is the molecular weight of 1-Hydroxy-2-methyldisulfane 1,1,2,2-tetraoxide. The quantity of water in the solution and the ratios of all other materials were the same as in the Comparative Example.

Example 2: The process of the Comparative Example was followed, except that the peptization solution was prepared by substituting nitric acid (dry) with equal mass of the selected water-soluble ODSO fraction relative to nitric acid, on a mass equivalent basis. The quantity of water in the solution and the ratios of all other materials were the same as in the Comparative Example.

Example 3: The process of the Comparative Example was followed, except that the peptization solution was prepared by substituting nitric acid (dry) with a proton[H+] release equivalent amount of the selected water-soluble ODSO fraction. Based a pH analysis, it is that 1.35 mol of ODSO can generate 1 mole of [H+] for the assumed molecular weight of 160 in the Examples herein. The quantity of water in the solution was reduced to maintain the same mass as the final solution in the Comparative Example and the ratios of all other materials were the same as in the Comparative Example.

Example Results and Analysis: Table 2 provides the crush strength and sulfur level for each example. The crush strength was measured by ASTM D6175-03. The sulfur level (shown as ratio of atomic sulfur in ODSO relative to silica, normalized, and as ODSO quantity, normalized) sample. The examples clearly demonstrate that the extrudates made with ODSO as a peptization agent for the binder have similar crush strength. The sulfur level has a strong correlation with the amount of ODSO using during preparation.

It is to be understood that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms ""including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

TABLE 1

| ODSO Name | Formula | Structure Examples |
|---|---|---|
| Dialkyl-thiosulfoxide or alkyl-alkane-sulfinothioate | (R—SO—S—R') | S-Methyl methanesulfinothioate |
| Dialkyl-thiosulfones or Alkyl-Alkane-thiosulfonate | (R—SOO—S—R') | Methyl Methanethiosulfonate |
| Dialkyl-sulfonesulfoxide Or 1,2-alkyl-alkyl-disulfane 1,1,2-trioxide | (R—SOO—SO—R') | 1,2-Dimethyldisulfane 1,1,2-trioxide |
| Dialkyl-disulfone Or 1,2 alkyl-alkyl-disulfane 1,1,2,2-tetraoxide | (R—SOO—SOO—R') | 1,2-Dimethyldisulfane 1,1,2,2-tetraoxide |
| Dialkyl-disulfoxide | (R—SO—SO—R') | 1,2-Dimethyldisulfane 1,2-dioxide |

TABLE 1-continued

| ODSO Name | Formula | Structure Examples |
|---|---|---|
| Alkyl-sulfoxidesulfonate | (R—SO—SOO—OH) | $H_3C-S(=O)-S(=O)_2-OH$<br>Methylsulfanesulfonic acid oxide |
| Alkyl-sulfonesulfonate | (R—SOO—SOO—OH) | $H_3C-S(=O)_2-S(=O)_2-OH$<br>1-Hydroxy-2-methyldisulfane 1,1,2,2-tetraoxide |
| Alkyl-sulfoxidesulfinate | (R—SO—SO—OH) | $H_3C-S(=O)-S(=O)-OH$<br>1-Hydroxy-2-methyldisulfane 1,2-dioxide |
| Alkyl-sulfonesulfinate | (R—SOO—SO—OH) | $H_3C-S(=O)_2-S(=O)-OH$<br>Methylsulfanesulfinic acid dioxide |

R and R' can be the same or different C1-C10 alkyl or C6-C10 aryl.

TABLE 2

| Example | Peptization Agent | Average Radial Crush Strength (N) | Peptizing Agent Quantity (Normalized to nitric acid) |
|---|---|---|---|
| Comparative | Nitric Acid | 28.9 | 1.00 |
| 1 | ODSO | 21.9 | 2.39 |
| 2 | ODSO | 28.4 | 1.00 |
| 3 | ODSO | 20.9 | 3.60 |

What is claimed is:

1. A method for manufacture of solid catalyst particles and/or solid catalyst support particles comprising contacting a mixture of solid catalyst components with an effective quantity of a peptization agent to peptize the mixture of solid catalyst components and form a peptized composite, and forming solid catalyst particles and/or solid catalyst support particles from the peptized composite, wherein the peptization agent includes one or more oxidized disulfide oil (ODSO) compounds.

2. The method as in claim 1, wherein the one or more ODSO compounds is selected from the group consisting of compounds having the general formula (R—SO—S—R'), (R—SOO—S—R'), (R—SOO—SO—R'), (R—SOO—SOO—R'), (R—SO—SO—R'), (R—SO—SOO—OH), (R—SOO—SOO—OH), (R—SO—SO—OH), (R—SOO—SO—OH), (R—SO—SO—OR'), (R—SOO—SO—OR'), (R—SO—SOO—OR') and (R—SOO—SOO—OR') wherein R and R' can be the same or different C1-C10 alkyl or C6-C10 aryl.

3. The method as in claim 1, wherein the one or more ODSO compounds is selected from the group consisting of water-soluble ODSO compounds having the general formula (R—SOO—SO—R'), (R—SOO—SOO—R'), (R—SO—SOO—OH), (R—SOO—SOO—OH), (R—SOO—SO—OH), (R—SO—SO—OR'), (R—SOO—SO—OR'), (R—SO—SOO—OR') and (R—SOO—SOO—OR') wherein R and R' can be the same or different C1-C10 alkyl or C6-C10 aryl.

4. The method as in claim 1, wherein the peptization agent comprises a mixture of two or more types of ODSO compounds selected from the group consisting of compounds having the general formula (R—SO—S—R'), (R—SOO—S—R'), (R—SOO—SO—R'), (R—SOO—SOO—R'), (R—SO—SO—R'), (R—SO—SOO—OH), (R—SOO—SOO—OH), (R—SO—SO—OH), (R—SOO—SO—OH), (R—SO—SO—OR'), (R—SOO—SO—OR'), (R—SO—SOO—OR') and (R—SOO—SOO—OR') wherein R and R' can be the same or different C1-C10 alkyl or C6-C10 aryl.

5. The method as in claim 1, wherein the peptization agent comprises a mixture of two or more types of water-soluble ODSO compounds selected from the group consisting of compounds having the general formula (R—SOO—SO—R'), (R—SOO—SOO—R'), (R—SO—SOO—OH), (R—SOO—SOO—OH), (R—SOO—SO—OH), (R—SO—SO—OR'), (R—SOO—SO—OR'), (R—SO—SOO—OR') and (R—SOO—SOO—OR') wherein R and R' can be the same or different C1-C10 alkyl or C6-C10 aryl.

6. The method as in claim 4, wherein the mixture of two or more types of ODSO compounds corresponds to oxidized disulfide oils present in an effluent refinery hydrocarbon stream recovered following catalytic oxidation of mercaptans present in the effluent refinery hydrocarbon stream.

7. Solid catalyst particles and/or solid catalyst support particles formed according to the method as in claim 1, containing sulfur from the ODSO within the particles.

8. Solid catalyst particles and/or solid catalyst support particles as in claim 7, which exhibit crush strength in the range of about 20-30 Newtons (N) per millimeter.

9. A method for manufacture of solid catalyst particles and/or solid catalyst support particles comprising:
providing a first intermediate composition comprising one or more base catalyst materials and/or one or more base catalyst support materials;
providing a second intermediate composition comprising one or more inorganic oxide materials;
mixing the first intermediate composition and the second intermediate composition to form an admixture;
contacting the admixture with an effective quantity of a peptization agent to peptize the admixture and form a peptized composite, wherein the peptization agent includes one or more oxidized disulfide oil (ODSO) compounds;
forming solid catalyst particles and/or solid catalyst support particles from the peptized composite.

10. The method as in claim 9, wherein the one or more ODSO compounds is selected from the group consisting of water-soluble ODSO compounds having the general formula (R—SOO—SO—R'), (R—SOO—SOO—R'), (R—SO—SOO—OH), (R—SOO—SOO—OH), (R—SOO—SO—OH), (R—SO—SO—OR'), (R—SOO—SO—OR'), (R—SO—SOO—OR') and (R—SOO—SOO—OR') wherein R and R' can be the same or different C1-C10 alkyl or C6-C10 aryl.

11. The method as in claim 9, wherein the one or more ODSO compounds is selected from the group consisting of compounds having the general formula (R—SO—S—R'), (R—SOO—S—R'), (R—SOO—SO—R'), (R—SOO—SOO—R'), (R—SO—SO—R'), (R—SO—SOO—OH), (R—SOO—SOO—OH), (R—SO—SO—OH), (R—SOO—SO—OH), (R—SO—SO—OR'), (R—SOO—SO—OR'), (R—SO—SOO—OR') and (R—SOO—SOO—OR') wherein R and R' can be the same or different C1-C10 alkyl or C6-C10 aryl.

12. The method as in claim 9, further comprising thermally treating the catalyst particles.

13. The method as in claim 9, wherein the first intermediate composition comprises zeolite, amorphous alumina silicate, silica, metal salts, or a mixture comprising two or more of zeolite, amorphous silica alumina, silica or metal salts.

14. The method as in claim 9, wherein the first intermediate composition comprises a mixture of zeolite and amorphous silica alumina.

15. The method as in claim 1, wherein the peptization agent peptizes the surface of the solid catalyst components and increases adhesion.

16. The method as in claim 9, wherein the one or more inorganic oxide material comprises alumina.

17. The method as in claim 9, wherein contacting the admixture with the peptization agent comprises mulling or kneading.

18. The method as in claim 17, further comprising adding deionized water during mulling or kneading to increase extrudability of the composite.

19. The method as in claim 9, wherein the ratio of a quantity of ODSO in the peptization agent to a quantity of the second intermediate composition is in the range of about 1:1 to about 1:1000.

20. The method as in claim 19, wherein the ratio of the quantity of ODSO in the peptization agent to the quantity of the second intermediate composition is in the range of about 1:1 to about 1:20.

* * * * *